Feb. 26, 1963

J. M. CURTIS 3,078,815

OUTDOOR TABLE

Filed May 31, 1961

INVENTOR:
JOHN M. CURTIS

BY Eaton, Bell, Hunt & Seltzer

ATTORNEYS

Feb. 26, 1963    J. M. CURTIS    3,078,815
OUTDOOR TABLE
Filed May 31, 1961    2 Sheets-Sheet 2
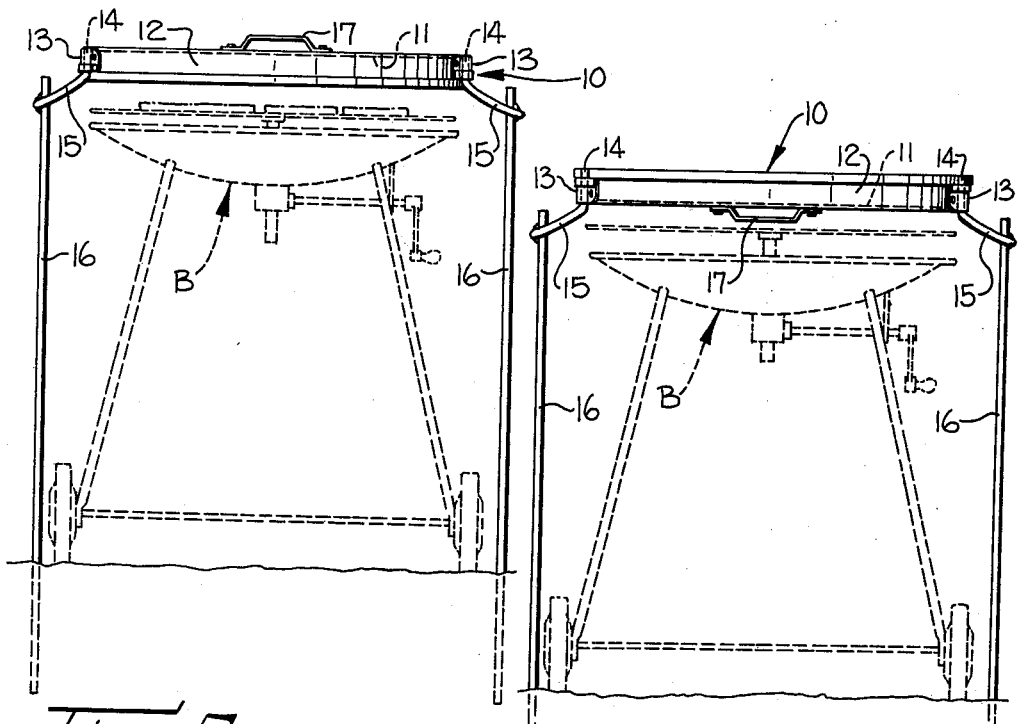
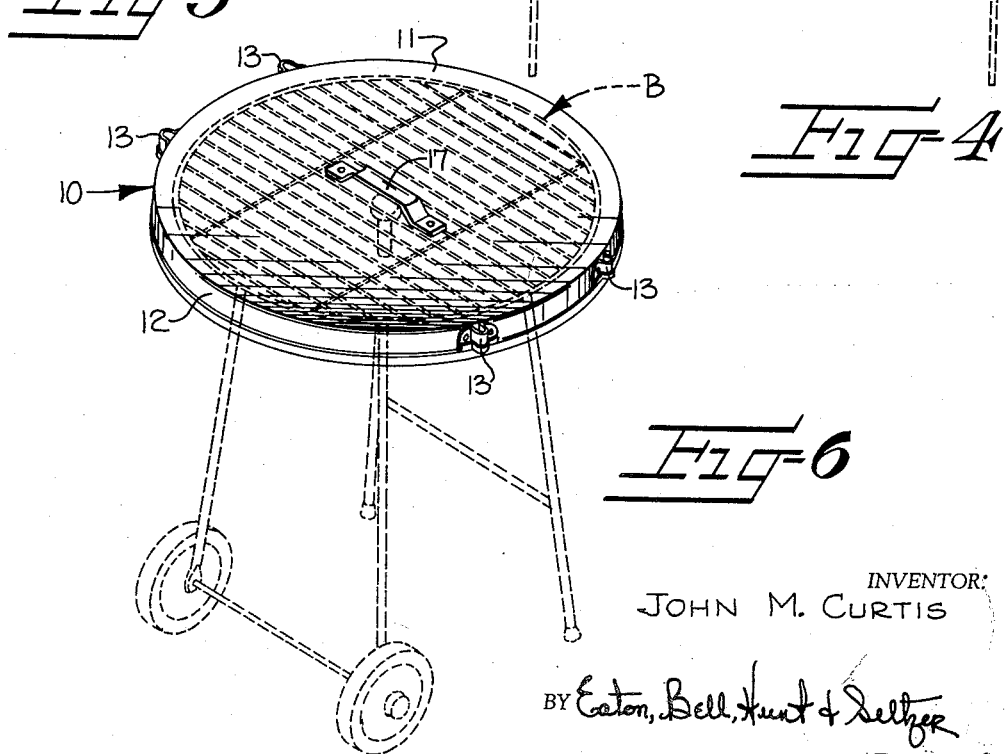
INVENTOR:
JOHN M. CURTIS
BY Eaton, Bell, Hunt & Seltzer
ATTORNEYS

United States Patent Office 3,078,815
Patented Feb. 26, 1963

3,078,815
OUTDOOR TABLE
John M. Curtis, College Park, Md., assignor to
W. C. Calton, Raleigh, N.C.
Filed May 31, 1961, Ser. No. 113,825
1 Claim. (Cl. 108—14)

This invention is concerned with apparatus particularly adapted to be used in conjunction with outdoor charcoal cooking apparatus.

With the recent surge in economic growth and standard of living which has occurred in this country and elsewhere during the past few years, there has been a commensurate increase in leisure time afforded most people. This additional leisure time has attributed greatly to the outgrowth of many new hobbies, a major one of which is outdoor cookery.

The great bulk of outdoor cooking is practiced in the adjacent yard surrounding the home with what is commonly called a "charcoal broiler." These charcoal broilers generally comprise a suitable type of receptacle for holding the burning charcoal and a grill which rests on top of the receptacle for supporting the food to be cooked above the charcoal and out of contact therewith. Usually, legs are provided for supporting the receptacle in an elevated position above the ground to thereby place the receptacle and grill portions at a convenient working height.

By far, the most common type of charcoal broiler has a circular receptacle or fire bowl for holding the charcoal. Such broilers are usually provided with three legs for supporting the fire bowl. Additionally, depending upon the price range of such broilers, wheels are quite often provided on two of the three legs to facilitate movement of the grill. Beyond this, many additional accessory features are available for such broilers, such as mechanism for adjusting the height of the grill above the fire bowl, accessory tables attachable to the side of the fire bowl, motorized spit assemblies, hoods for entrapping smoke, etc., such as disclosed, for example, in United States Patents Nos. 2,768,042 to Persinger et al. and 2,886,386 to Spitzer.

As evidenced in the aforementioned patents to Persinger et al. and Spitzer, it is highly desirable for practitioners of outdoor cookery to be provided with a table or work surface closely adjacent the broiler for holding beverages, food, cooking utensils or the like. It is to the need for such a work surface that this invention is partially directed.

An additional need encountered in the use of charcoal broilers arises out of the fact that subsequent to cooking, the burning coals and ashes remaining in the fire bowl are quite susceptible to being blown out of the fire bowl which, of course, is both obnoxious and dangerous to persons in close proximity thereto. Also, should it begin raining during or subsequent to cooking, a problem is created in protecting the food being cooked and/or the burning coals from such rain. Accordingly, it is to the need for a covering or sheltering device for charcoal broilers that this invention is also directed.

With the above background material in mind it is the primary object of this invention to provide an outdoor table particularly useful in conjunction with charcoal broilers.

It is a more specific object of this invention to provide an outdoor table particularly useful in conjunction with charcoal broilers, which table is readily convertible into a protective or sheltering device for such broilers in the event of the occurrence of wind or inclement weather.

It is a still more specific object of this invention to provide a combination outdoor table and protective device for use in conjunction with charcoal broilers wherein a broiler can readily be positioned beneath the table and wherein the table top can be inverted and repositioned on the legs of the table to form a hood or shield, or wherein the top by itself can be used as a protective cover for the fire bowl of the grill.

Some of the objects of the invention having been stated, other objects will appear as the description proceeds, when taken in connection with the accompanying drawings, in which—

FIGURE 4 is a side elevation of the table shown in FIGURE 1 having a charcoal broiler, shown in dotted lines, positioned therebeneath;

FIGURE 5 is a view similar to FIGURE 4, but showing the table top inverted therefrom to thereby form a hood or protective device for a charcoal broiler; and FIGURE 6 is a perspective view showing the table top inverted and resting upon and covering the fire bowl of a charcoal broiler, shown in dotted lines.

Figure 1:
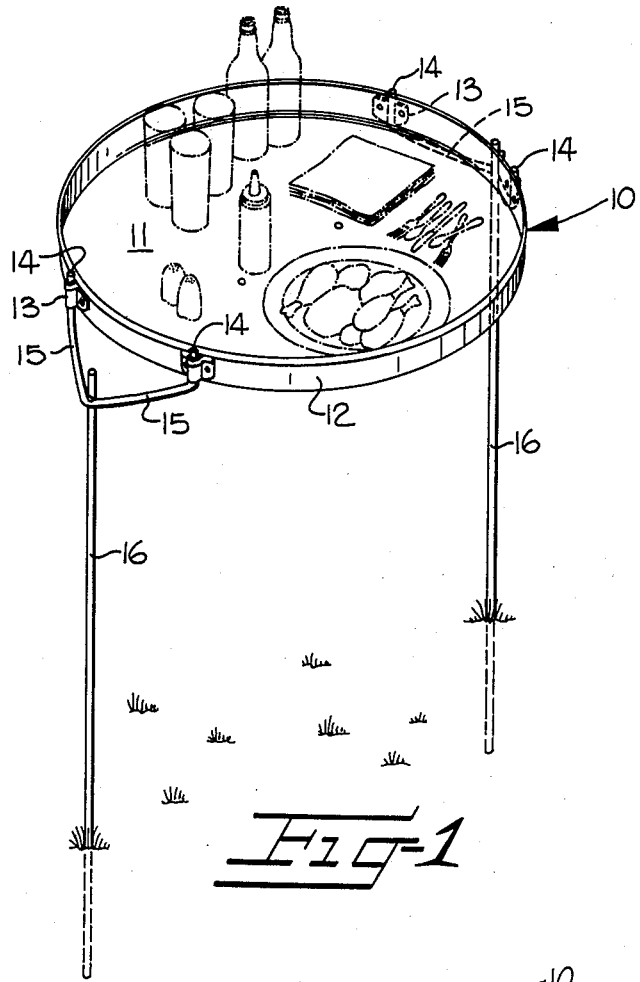
FIGURE 1 is a perspective view of a table of the instant invention wherein the same is supported by a pair of ground penetrating legs and showing in dotted lines food, beverages and utensils positioned thereon.
Figure 3:
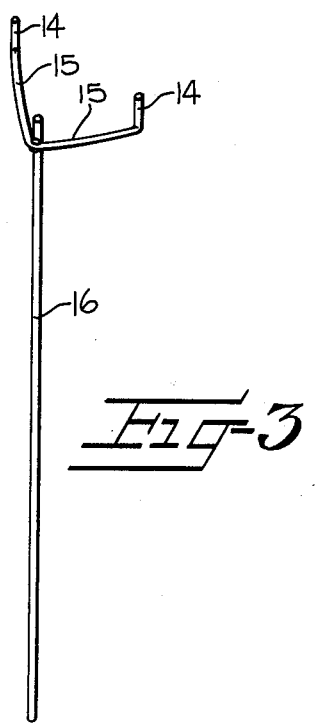
FIGURE 3 is a perspective view of one of the table legs shown in FIGURE 1.
Figure 2:
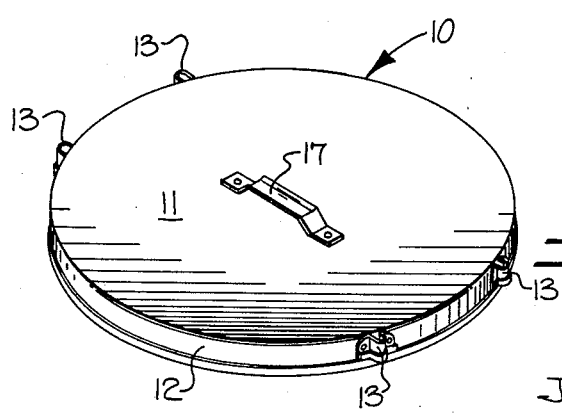
FIGURE 2 is a perspective view of the table top of FIGURE 1 and showing the top in inverted position.

Referring now more specifically to the drawings and particularly to FIGURES 1 to 3, the numeral 10 broadly designates the table top preferably formed of sheet metal, which comprises, in the particular embodiment shown, a substantially circular disk 11 having a flange 12 around the outer periphery thereof forming a substantially vertical sidewall.

A plurality of spaced apart sleeves or brackets 13 are suitably connected to the outer surface of the flange 12, with the sleeves being preferably vertically disposed for slidably receiving therein upturned inner end portions 14 of arms 15. It should be noted that the angles formed in the arms 15, at the junctures of the lower ends of the upturned portions 14, serve to provide abutments or shoulders on the arms for engagement of the sleeves therewith.

As shown in the drawings, two opposing pairs of sleeves are provided positioned substantially on opposite sides of the table top 10. The arms 15 are also arranged in pairs and extend outwardly and downwardly from the sleeves 13 with the outer ends of the arms of each pair being suitably secured together and convergingly arranged relative to each other.

A plurality of upright rod-like legs 16 are suitably connected, as for example by welding, to the outer ends of the arms 15 for supporting the table top 10 in elevated position above the ground. As shown, only a pair of legs 16 are provided, with the legs being positioned on opposite sides of the table top 10, with their lower ends being adapted to penetrate the ground to thereby provide stability to the table. Preferably, as shown, the arms 15 are connected to the legs 16 at a point below the upper terminal ends of the legs thereby providing an unobstructed upper end, thus permitting the legs readily to be driven into the ground, as for example by hitting the upper ends with a hammer or the like.

As can readily be seen, the table shown in FIGURE 1 can be set up at any desirable location in one's yard during outdoor cooking to thus provide a suitable surface for receiving beverages, food, utensils and the like. Furthermore, as shown in FIGURE 4, a charcoal broiler having a fire bowl of substantially the same or less diameter than the table top 10 can readily be positioned beneath the top 10 and between the legs 16 since the distance between the legs 10 is greater than the diameter of the top 10 due to the previously described arrangement of the connecting arms 15. Upon so positioning a broiler B, as shown in dotted lines in FIGURE 4, having a fire therein, the top 10 will become heated and thus may be used for keeping warm food which has already been cooked and awaiting service.

As shown in FIGURE 2, the top 10 is provided with a handle 17 secured thereto by rivets or the like, which handle aids in repositioning the top when converting the table of the invention into a covering or sheiternig device as shown in FIGURES 5 and 6.

Referring now specifically to FIGURE 5, the top 10 is inverted and positioned upon the upturned inner end portions 14 of the arms 15 by having such portions 14 being slidably received in the sleeves 13 in the manner previously described with reference to FIGURE 1. In this inverted position, the top 10 serves as a hood upon a broiler B being positioned therebeneath to thereby aid in entrapping smoke from the fire in the broiler where such smoke is wanted for flavoring the food being cooked and/or to thereby serve as a protective device for the broiler B and the food thereon in the event of rain.

FIGURE 6 shows the top 10 also inverted but with the legs removed and resting directly on top of the broiler B and thereby serving as a cover for the fire bowl thereof after the same has been used for cooking. As such, the top 10 not only serves to prevent burning coals or ashes from blowing out of the fire bowl, but also helps extinguish the coals as well as protects the fire bowl from filling up with water in the event of rain.

It will thus be seen that there has been provided an outdoor table which may be readily used in a variety of different positions in association with charcoal broilers for a wide variety of desirable purposes.

In the drawings and specifications there has been set forth a preferred embodiment of the invention, and although specific terms are employed, they are used in a generic and descriptive sense only and not for purposes of limitation, the scope of the invention being defined in the claim.

I claim:

An outdoor table adapted to be used in conjunction with a charcoal broiler having a substantially circular shaped fire bowl comprising an invertable substantially circular top formed of sheet-metal and having a peripheral vertically extending flange forming a side wall therefor, two pairs of vertically disposed open-ended sleeve members mounted on the outer surface of said side wall with said pairs of sleeve members in opposing relationship, handle means provided on a medial portion of said top and extending therefrom in a direction opposite to said side wall, two pairs of arms extending outwardly and downwardly from said sidewall, each of said arms having upturned inner end portions being received in said sleeve members for detachably supporting said top therefrom and to permit said top to readily be inverted, and each of said pairs of arms having their outer end portions convergingly arranged relative to each other, a pair of uprightly disposed elongate rod-like legs, each leg being connected to one of said pairs of arms at a point intermediate the upper and lower ends of said legs and supporting said top in elevated position above the ground, the lower portions of said legs being adapted to penetrate the ground for maintaining the table in upright position, and the upper portions of said legs extending above the connection between each leg and pair of arms to thus provide an unobstructed upper end portion for each leg thereby permitting the legs readily to be driven into the ground.

References Cited in the file of this patent

UNITED STATES PATENTS

| | | |
|---|---|---|
| 836,555 | Birnie | Nov. 20, 1906 |
| 1,264,228 | Uhl | Apr. 30, 1918 |
| 1,560,404 | Brown | Nov. 3, 1925 |
| 1,667,913 | Weston | May 1, 1928 |
| 1,725,370 | Richards | Aug. 20, 1929 |
| 2,886,386 | Spitzer | May 12, 1959 |

FOREIGN PATENTS

| | | |
|---|---|---|
| 372,791 | Great Britain | May 12, 1932 |
| 387,188 | Great Britain | 1932 |
| 1,231,136 | France | Sept. 27, 1960 |